United States Patent
Seki et al.

(10) Patent No.: US 7,439,880 B2
(45) Date of Patent: Oct. 21, 2008

(54) IMAGE CODING DEVICE

(75) Inventors: Yukinaga Seki, Kyoto (JP); Takuma Chiba, Osaka (JP); Tatsuro Juri, Osaka (JP); Kenjiro Tsuda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/822,971

(22) Filed: Jul. 11, 2007

(65) Prior Publication Data

US 2008/0012738 A1    Jan. 17, 2008

(30) Foreign Application Priority Data

Jul. 13, 2006   (JP)   ............... 2006-193332

(51) Int. Cl.
*H03M 7/34*   (2006.01)
(52) U.S. Cl. .................... 341/51; 375/240.03
(58) Field of Classification Search ............ 341/51; 375/240.03, 240.24, 240.23, 240.16, 240.02; 382/232, 233
See application file for complete search history.

(56) References Cited

U.S. PATENT DOCUMENTS 7,301,485 B2 * 11/2007 Senda .................. 341/107

2005/0249289 A1   11/2005 Yagasaki et al.

FOREIGN PATENT DOCUMENTS

JP   2004-135251   4/2004

* cited by examiner

*Primary Examiner*—Rexford Barnie
*Assistant Examiner*—Joseph Lauture
(74) *Attorney, Agent, or Firm*—Wenderoth, Lind & Ponack, L.L.P.

(57) ABSTRACT

An image coding device is provided that includes an image coding unit which codes image data, a binarization unit which binarizes the coded data, an intermediate buffer, an accumulated amount measuring unit which measures an amount of data in the intermediate buffer, and an I_PCM judging unit which compares the measured amount of data with a threshold. A buffer input selection unit is also provided which causes the intermediate buffer to accumulate next binary data when the amount of the data does not exceed the threshold and causes the intermediate buffer to accumulate next I_PCM data when the amount of the data exceeds the threshold. In addition, the device includes an arithmetic coding unit that arithmetically codes the binary data accumulated in the intermediate buffer and an output selection unit outputs the arithmetically coded data or the I_PCM data.

20 Claims, 9 Drawing Sheets

IMAGE CODING DEVICE

BACKGROUND (1) Field of the Invention

The invention relates to an image coding device that codes data relating to moving images, and more particularly, relates to an image coding device compliant with the H.264/AVC standard.

(2) Description of the Related Art

In recent years, with the development of digital imaging techniques, the amount of handled image data, particularly, the amount of moving image data is increasing. For example, in a High Definition (HD) image, which is in practical use these days, the amount of data is about six times as many as that of a conventional Standard Definition (SD) image.

On the other hand, with the improvement of information processing capability of computers and other equipment, moving images can be compressed using complex operations and the compression rate of image data is significantly increasing. H.264/AVC, which was standardized in recent years, is a standard that achieves about twice the compression rate of MPEG-2. H.264/AVC achieves a high compression rate by combining many compression techniques. Therefore, when compared to conventional compression methods, the amount of operations is also significantly increasing.

One compression technique used in H.264/AVC is entropy coding (variable-length coding). In H.264/AVC, two methods of entropy coding are available: Context-based Adaptive Variable Length Coding (CAVLC) and Context-based Adaptive Binary Arithmetic Coding) CABAC.

Coding in CABAC is categorized into mainly two processes. The first is a process called binarization, which converts multi-valued data to be coded into binary data. The second is a process to calculate and update the occurrence probability of binary data obtained by the binarization and perform arithmetic coding.

The binarization is performed on each syntax element, and an unconstant amount of bits are outputted at irregular intervals. On the other hand, since, in arithmetic coding, coding is performed based on the occurrence probability of binary data, which is sequentially updated for each bit, it is difficult to arithmetically code a large amount of bits per clock in terms of implementation. Therefore, a buffer to temporarily keep the binary data is needed between a binarization unit and an arithmetic coding unit.

FIG. 1 is a diagram showing an example of changes in throughputs or accumulated amounts in a binarization unit, a buffer and an arithmetic coding unit in a conventional image coding device.

In each graph of FIG. 1, a vertical axis represents the throughput or accumulated amount of each processing unit, one scale corresponding to one bit. Additionally, a horizontal axis represents time, one scale corresponding to one clock.

In addition, it is assumed that an arithmetic coding unit 53 in the drawing has a processing capability to process one bit/clock.

For example, binary data having two bits outputted from a binarization unit 51 at t0 is accumulated in a buffer 52 at t1. In addition, one of the two bits of binary data accumulated in the buffer 52 is arithmetically coded by the arithmetic coding unit 53 at t2.

As a result, at t2, the accumulated amount in the buffer 52 should be one bit. When such data flow continues intermittently, a considerable increase in the accumulated amount in the buffer 52 is prevented.

However, for example, a case is assumed where, as shown in FIG. 1, binary data having five bits is outputted from the binarization unit 51 at t7 and t9. Even in this case, the amount processed by the arithmetic coding unit 53 is one bit/clock.

In other words, when a large amount of binary data is outputted almost continuously from the binarization unit 51, a processing delay with respect to the output from the binarization unit 51 occurs in the arithmetic coding unit 53, and the binary data is accumulated in the buffer 52. Therefore, CABAC needs a large-capacity buffer.

In addition, in H.264/AVC, the maximum amount of coding after arithmetic coding is specified; for example, the maximum amount of coding per macroblock is limited to 3200 bits where the format is 4-2-0 and bit_depth=8 bits. Further, as a result of arithmetic coding of a macroblock, when the amount of coding exceeds 3200 bits, coding must be performed again after the coding condition for the macroblock is changed. This also causes a processing delay in the arithmetic coding unit.

As described above, in an image coding device compliant with the H.264/AVC standard, processing capability per unit time of the arithmetic coding unit is constant. Therefore, when a large amount of binary data is generated at a given time, a processing delay involved in the arithmetic coding would have an effect on the flow of processing in the entire device.

Accordingly, a technique to reduce the effect of the processing delay involved in the arithmetic coding in the image coding device is disclosed (see e.g. Japanese Unexamined Patent Application Publication No. 2004-135251).

According to this conventional image coding device, the amount of binary data inputted into the arithmetic coding unit or the amount of data outputted from the arithmetic coding unit is monitored. In addition, when the amount of data exceeds a certain amount in a predetermined unit such as a picture, a slice or a macroblock, data to be arithmetically coded is not coded again, but I_PCM data, which is uncompressed data, is outputted as a bit stream (hereinafter also referred to as "stream").

FIG. 2 is a functional block diagram showing the functional configuration of the conventional image coding device.

An image coding device 500 shown in FIG. 2 is an example of a conventional image coding device, which codes inputted image data and outputs the data as a bit stream. The overview of the operation of the image coding device 500 will be described below.

Note that image data includes various data related to a moving image, such as macroblock type control data or other attribute data, in addition to data related to the pixel value of a macroblock that constructs the moving image.

Image data to be coded is first inputted into a motion prediction unit 102 and an intra-picture prediction unit 103. In addition, the data is also inputted into an I_PCM data buffer 114, and stored as I_PCM data.

The motion prediction unit 102 detects a block highly correlated with a block to be coded from a picture different from a picture including the block to be coded. In addition, the motion prediction unit 102 determines a difference image between the block to be coded and the detected block, and outputs the difference image and a motion vector.

The intra-picture prediction unit 103 predicts the image of the block to be coded using the images of neighboring blocks. In addition, the intra-picture prediction unit 103 determines a difference image between the image of the block to be coded and the predicted image, and outputs the difference image and data representing the method of the prediction.

An input selection unit 104 selects either data outputted from the motion prediction unit 102 or the data outputted from the intra-picture prediction unit 103 based on each data amount, and inputs the data into an orthogonal transformation unit 105.

An orthogonal transformation coefficient obtained by orthogonal transformation performed by the orthogonal transformation unit 105 is inputted into a quantization unit 106, and quantized by the quantization unit 106.

A post-quantization coefficient, which is a quantized orthogonal transformation coefficient, is converted by a binarization unit 131 into binary data (shown as "bin" in the drawing), and inputted into an intermediate buffer 112. In addition, the I_PCM data is also outputted from the I_PCM data buffer 114 and inputted into the intermediate buffer 112.

After that, the binary data outputted from the intermediate buffer 112 is arithmetically coded by an arithmetic coding unit 132. At the time of the arithmetic coding, a variable table, in which variables representing the occurrence probability of "1" or "0" in the binary data are recorded, is referred to, and updated according to the result of the coding. The variable table is kept in the intermediate buffer 112, for example, and shown as "table A" in FIG. 2.

In addition, the data obtained by arithmetic coding (hereinafter referred to as "arithmetically coded data") is kept in an output buffer 133.

Here, a data amount measuring unit 122 measures the amount of data inputted into the arithmetic coding unit 132. An I_PCM judging unit 121 judges whether the data to be outputted as a bit stream at each predetermined unit should be the arithmetically coded data kept in the output buffer 133, or the I_PCM data kept in the intermediate buffer 112, based on the amount of input data measured by the data amount measuring unit 122. More specifically, when the measured amount of input data exceeds a predetermined threshold, the I_PCM judging unit 121 judges that data to be outputted as a bit stream should be switched to the I_PCM data.

Note that although the amount of data inputted into the arithmetic coding unit 132 is used for the I_PCM judgment, the amount of data outputted from the arithmetic coding unit 132 may be used.

An output selection unit 113 follows the judgment of the I_PCM judging unit 121 to output either the arithmetically coded data kept in the output buffer 133 or the I_PCM data kept in the intermediate buffer 112.

In addition, when the I_PCM data is outputted, the above table A is updated at the time of obtaining the arithmetically coded data which is not to be outputted. Therefore, the table A has to be restored to its pre-update state.

Therefore, the table A in the pre-update state is kept in the intermediate buffer 112, for example. The table A in the pre-update state is shown as "table B" in FIG. 2. When the arithmetically coded data is not outputted, the arithmetic coding unit 132 rewrites the contents of the table A with the contents of the table B to restore the table A to the pre-update state.

Additionally, since the I_PCM data is outputted by bypassing the arithmetic coding unit, a large amount of data can be outputted per clock. Consequently, when a large amount of binary data is generated at the binarization unit 131, the output is switched to the I_PCM data as described above, so that the effect on the processing delay involved in arithmetic coding can be reduced.

However, in the above conventional technique, there are problems as described below.

(1) Everything that is generated flows into the intermediate buffer 112 together with binary data and I_PCM data. In other words, the binary data and the I_PCM data, which are practically not used for output streams, are also accumulated in the intermediate buffer 112.

Consequently, in the above conventional image coding device, it is necessary to provide a buffer which has a capacity larger than that of a buffer in which only binary data is temporarily accumulated as shown in FIG. 2.

(2) The arithmetically coded data outputted from the arithmetic coding unit 132 needs also to be kept in the output buffer 133 until whether to select the arithmetically coded data or the I_PCM data to be outputted is finally determined.

(3) When the I_PCM data is selected as an output stream, the updated variable table has to be restored to its pre-update state as described above. Therefore, in addition to the variable table, which is referred to and updated at the time of arithmetic coding, a variable table in the pre-update state always needs to be kept in the intermediate buffer 112 or the like.

Note that the capacity of each buffer can be reduced by accumulating the binary data, the I_PCM data, and two types of variable tables in their specific buffers, respectively. However, even in so doing, the necessary capacity of the buffer is the same for the whole image coding device.

As described above, although delay time involved in the re-coding of binary data is reduced when the above conventional technique is used, there is a problem that a large buffer capacity is still needed.

An aspect of the invention provides an image coding device that arithmetically codes binary data using a smaller buffer capacity.

SUMMARY

In order to solve the above described conventional problems, the image coding device according to an aspect of the invention includes: an image coding unit which sequentially codes image data per predetermined unit; a binarization unit which binarizes the coded image data obtained from the image coding unit; an accumulation unit which accumulates I_PCM data or binary data per predetermined unit corresponding to the image data, the binary data being obtained from the binarization unit; a measuring unit which measures an amount of data accumulated in the accumulation unit; a comparison unit which compares the amount of the data measured by the measuring unit with a threshold per predetermined unit; an accumulation selection unit which, based on a result of the comparison by the comparison unit, causes the accumulation unit to accumulate binary data obtained by inputting next coded image data into the binarization unit when the amount of the data does not exceed the threshold and causes the accumulation unit to accumulate next I_PCM data when the amount of the data exceeds the threshold; an arithmetic coding unit which arithmetically codes the binary data accumulated in the accumulation unit; and an output unit which outputs the arithmetically coded data obtained from the arithmetic coding unit when the binary data is arithmetically coded by the arithmetic coding unit and outputs the I_PCM data accumulated in the accumulation unit when the I_PCM data is accumulated in the accumulation unit.

With this configuration, the image coding device can judge whether or not to select I_PCM data as data that is to be accumulated in the accumulation unit before coded data of a predetermined unit is binarized. In addition, the image coding device accumulates in the accumulation unit only data used for final output.

Therefore, each of three main problems of the conventional technique is solved as described below.

(1) Binary data and I_PCM data, which are not used for output, do not have to be kept in a buffer, which is an example of the accumulation unit.

(2) The above judgment is performed before the coded data is binarized. Therefore, unlike an output buffer in a conventional image coding device, there is no need to provide a buffer to keep arithmetically coded data until a judgment of whether or not to output the arithmetically coded data is made.

(3) Binary data, which is not used for output, is not arithmetically coded. In other words, since a variable table is not unnecessarily updated, there is no need to keep the variable table in the pre-update state in the buffer.

As described above, in the image coding device according to an aspect of the invention, as compared with the conventional image coding device, the amount of data kept in a buffer is reduced as the whole image coding device. In other words, binary data can be arithmetically coded with buffer capacity smaller than that of the conventional image coding device.

Note that the invention can be achieved not only as the above image coding device, but also as an image coding method, a program that causes a computer to execute the method, and a storage medium in which the program is recorded. In addition, needless to say, the program can be delivered through a transmission medium such as the Internet, or a storage medium such as DVD.

As described above, the invention can provide an image coding device that arithmetically codes binary data with buffer capacity smaller than that of the conventional image coding device.

FURTHER INFORMATION ABOUT TECHNICAL BACKGROUND TO THIS APPLICATION

The disclosure of Japanese Patent Application No. 2006-193332 filed on Jul. 13, 2006 including specification, drawings and claims is incorporated herein by reference in its entirety.

BRIEF DESCRIPTION OF THE DRAWINGS

Advantages and features of the invention will become apparent from the following description thereof taken in conjunction with the accompanying drawings that illustrate a specific embodiment of the invention. In the Drawings.

DETAILED DESCRIPTION

Embodiments of the invention will be described below with reference to the drawings.

FIRST EMBODIMENT

Figure 3:
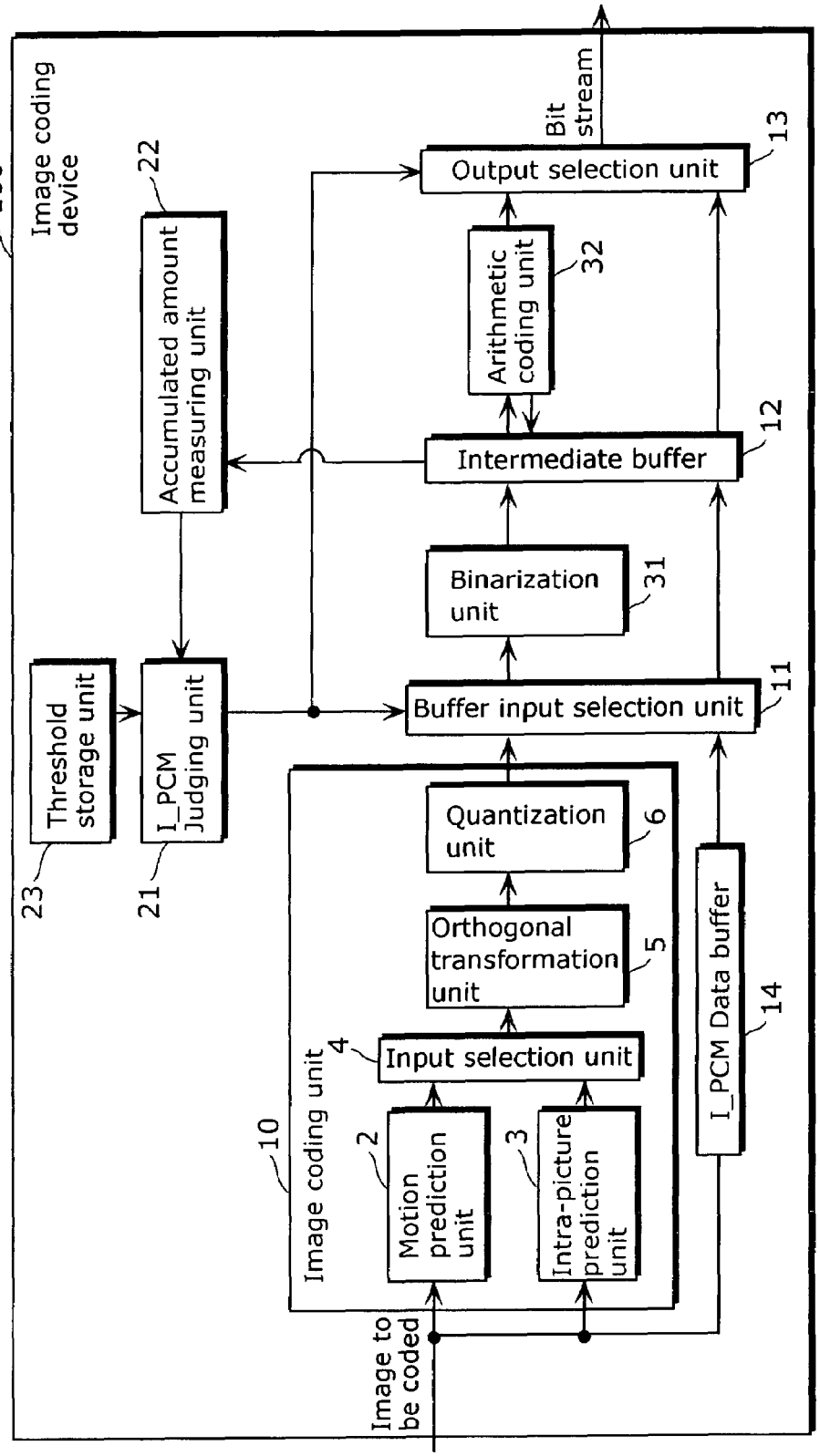
FIG. 3 is a functional block diagram showing the functional configuration of the image coding device of a first embodiment of the invention.

FIG. 3 is a functional block diagram showing the functional configuration of the image coding device of a first embodiment of the invention.

An image coding device 100 of the embodiment has an image coding unit 10, a buffer input selection unit 11, an I_PCM data buffer 14, an intermediate buffer 12, an output selection unit 13, an I_PCM judging unit 21, an accumulated amount measuring unit 22, a threshold storage unit 23, a binarization unit 31, an arithmetic coding unit 32 and an I_PCM data buffer 14.

The image coding unit 10 is a processing unit that codes inputted image data per predetermined unit, and has a motion prediction unit 2, an intra-picture prediction unit 3, an input selection unit 4, an orthogonal transformation unit 5 and a quantization unit 6.

Note that the predetermined unit means a picture, a slice, a macroblock or the like, which is a unit of an aggregate of pixels that construct a moving image. Hereinafter, the predetermined unit is also referred to as "unit of coding".

The functions and operations of these components that the image coding unit 10 has are the same as those of the motion prediction unit 102, the intra-picture prediction unit 103, the input selection unit 104 and the quantization unit 106 in the conventional image coding device described with reference to FIG. 2.

Note that since other components that the image coding device inherently has, such as components that perform inverse quantization and inverse orthogonal transformation, are not directly related to the effects of the invention, the graphic representation and description of them are omitted.

The intermediate buffer 12, which is an example of an accumulation unit in the image coding device of the invention, is a component that accumulates I_PCM data per unit of coding, which corresponds to image data inputted into the image coding device 100, or binary data obtained by the binarization unit 31.

Further, a variable table, which is referred to and updated by the arithmetic coding unit 32, is also kept in the intermediate buffer 12.

The accumulated amount measuring unit 22, which is an example of a measuring unit in the image coding device of the invention, is a processing unit that measures the amount of data accumulated in the intermediate buffer 12.

The I_PCM judging unit 21, which is an example of a comparison unit in the image coding device of the invention, is a processing unit that compares, per unit of coding, the amount of data measured by the accumulated amount measuring unit 22 with a threshold. The threshold is stored in the threshold storage unit 23.

The I_PCM judging unit 21 also gives the buffer input selection unit 11 an instruction to accumulate either the binary data or the I_PCM data in the intermediate buffer 12 according to the result of the above comparison.

In the other words, the I_PCM judging unit 21 makes a judgment whether to accumulate the binary data or the I_PCM data in the intermediate buffer 12, based on the amount of data measured by the accumulated amount measuring unit 22. Hereinafter, this judgment is also referred to as "I_PCM judgment".

The buffer input selection unit 11, which is an example of an accumulation selection unit in the image coding device of the invention, is a processing unit that causes the intermediate buffer 12 to accumulate either the binary data or the I_PCM data in accordance with the instruction from the I_PCM judging unit 21.

More specifically, when a result of the comparison by the I_PCM judging unit 21 shows that the measured amount of data does not exceed the threshold, the buffer input selection unit 11 causes the intermediate buffer 12 to accumulate the binary data which is obtained by inputting, into the binarization unit 31, the next coded data obtained by the image coding unit 10, in accordance with the instruction from the I_PCM judging unit 21.

In addition, when a result of comparison by the I_PCM judging unit 21 shows that the measured amount of data exceeds the threshold, the buffer input selection unit 11 causes the intermediate buffer 12 to accumulate the next I_PCM data to be accumulated, in accordance with the instruction from the I_PCM judging unit 21.

The binarization unit 31 is a processing unit that binarizes coded data when the coded data obtained by the image coding unit 10 is inputted. In addition, binary data obtained by the binarization unit 31 is accumulated in the intermediate buffer 12.

The arithmetic coding unit 32 is a processing unit that arithmetically codes the binary data accumulated in the intermediate buffer 12. This allows arithmetically coded data to be obtained.

The output selection unit 13, which is an example of an output unit in the image coding device of the invention, is a processing unit that outputs, as a bit stream, either arithmetically coded data or I_PCM data, per unit of coding.

More specifically, the output selection unit 13 receives a notification of the comparison result from the I_PCM judging unit 21, and, when the measured amount of data does not exceed the threshold, outputs, as a bit stream, the arithmetically coded data obtained by the arithmetic coding unit 32. On the other hand, when the measured amount of data exceeds the threshold, the output selection unit 13 outputs, as a bit stream, the I_PCM data accumulated in the intermediate buffer 12.

In other words, when the binary data is arithmetically coded by the arithmetic coding unit 32, the output selection unit 13 outputs the arithmetically coded data obtained by the arithmetic coding unit 32, and on the other hand, when I_PCM data is accumulated in the intermediate buffer 12, the output selection unit 13 outputs the I_PCM data accumulated in the intermediate buffer 12.

Here, the image coding device 100 does not have a buffer that corresponds to the output buffer 133 that the conventional image coding device is provided with, as described with reference to FIG. 2. The reason is as follows.

Namely, unlike the conventional image coding device, in the image coding device 100, only arithmetically coded data that is to be finally outputted as a bit stream is outputted from the arithmetic coding unit 32. Accordingly, arithmetically coded data obtained by the arithmetic coding unit 32 can be outputted as a bit stream directly without having to be kept in a buffer. Therefore, the image coding device 100 does not have to have a buffer that corresponds to the conventional output buffer 133.

With reference to FIG. 3, the operation of the image coding device 100 of the present embodiment constructed as described above will be described.

Note that the following description will be made assuming that the image coding device 100 is in a state where the operation related to image coding has started, and binary data or I_PCM data is accumulated in the intermediate buffer 12.

When image data to be coded is inputted into the image coding device 100, the data is first inputted into the motion prediction unit 2 and the intra-picture prediction unit 3 in the image coding unit 10. In addition, the data is also inputted into an I_PCM data buffer 14, and kept as I_PCM data.

The input selection unit 4 selects output data from either the motion prediction unit 2 or the intra-picture prediction unit 3, and inputs the data into the orthogonal transformation unit 5. An orthogonal transformation coefficient obtained by orthogonal transformation is inputted into the quantization unit 6 to be quantized.

Such operation of each component allows coded data to be obtained from the image coding unit 10.

Based on control information that the intermediate buffer 12 has, the accumulated amount measuring unit 22 measures, per unit of coding, the amount of data accumulated in the intermediate buffer 12 (hereinafter referred to as "buffered data amount") and outputs the data amount to the I_PCM judging unit 21.

The I_PCM judging unit 21 compares, per unit of coding, the buffered data amount inputted from the accumulated amount measuring unit 22 with the threshold kept in the threshold storage unit 23.

The threshold is determined, for example, based on a difference between a capacity available for accumulating the data in a state where neither binary data nor I_PCM data is accumulated in the intermediate buffer 12 (hereinafter referred to as "accumulable capacity") and each of the assumed maximum amounts of binary data and I_PCM data per unit of coding, and is stored in the threshold storage unit 23.

Here, one example of determination method of the above threshold will be described. For example, a case is assumed where accumulable capacity is 20000 bits, and the assumed maximum amounts of binary data and I_PCM data per unit of coding are 4000 bits and 3000 bits, respectively.

In addition, a case is assumed where processable amount of the arithmetic coding unit 32 per processing period that corresponds to a unit of coding (hereinafter also referred to as "cycle") is 1000 bits. For example, when, at a certain point, binary data having 10000 bits is accumulated in the intermediate buffer 12, and, in the next cycle, binary data having 2000 bits is inputted into the intermediate buffer 12, 1000 bits that are accumulated are outputted from the intermediate buffer 12 to the arithmetic coding unit 32, therefore, the accumulated amount of the intermediate buffer 12 seemingly increases by "2000−1000", and reaches 11000 bits.

Under such an assumption, letting the threshold be X (0 bit<X<20000 bits), when the buffered data amount is X in a certain cycle [n], in other words, when the buffered data amount does not exceed the threshold X, binary data is inputted in the intermediate buffer 12 in the next cycle [n+1].

Accordingly, the buffered data amount in the cycle [n+1] reaches "X+4000−1000" at the maximum (unit is in bits, the same hereinafter). In other words, letting the buffered data amount be A, the minimum remaining capacity of the intermediate buffer 12 in the cycle [n+1] is "20000−A".

In addition, since buffered data amount in the cycle [n+1] exceeds the threshold X, the I_PCM data is inputted into the intermediate buffer 12 in the next cycle [n+2].

Here, when the entirety of the buffered data amount A is binary data, until the entirety of the buffered data amount A is consumed, the data is consumed only by 1000 bits per cycle, which represents a state where the intermediate buffer 12 is most likely to overflow.

Thus, under this assumption, a threshold X that prevents the intermediate buffer 12 from overflowing will be determined as follows.

Since a state where I_PCM data is inputted into the intermediate buffer 12 and binary data is outputted from the intermediate buffer 12 continues in the cycles from cycle [n+2] onward, there is an increase from the buffered data amount A by "3000−1000" at maximum per cycle.

However, if, before the intermediate buffer 12 overflows, all the data that is accumulated before the cycle [n+1] is outputted, in other words, all the binary data is outputted, the I_PCM data that is accumulated from the cycle [n+2] onward is outputted, therefore, a large amount of data is outputted at once from the intermediate buffer 12. Consequently, the buffered data amount comes to be reduced to be under the threshold X.

Accordingly, if the amount of the increase from the buffered data amount A during the time period from the cycle [n+2] to the cycle immediately before I_PCM data is outputted does not exceed the above mentioned minimum remaining capacity "20000−A", the intermediate buffer 12 does not overflow.

Thus, considering formulation of an equation to meet this condition, the maximum value per cycle of the amount of an increase from the buffered data amount A during the above time period is "3000−1000" as described above.

In addition, the maximum number of cycles is the number obtained by dividing the buffered data amount A by the amount of consumption per cycle "1000", that is "A/1000".

In other words, "(3000−1000)×A/1000" is the maximum value of the amount of an increase from the buffered data amount A during the above described time period.

Therefore, the threshold X can be determined as a value that meets (Equation 1) as shown below.

$$20000-(X+4000-1000)>(3000-1000)\times(X+4000-1000)/1000 \quad \text{(Equation 1)}$$

The value X that meets the above (Equation 1) is a value equal to or less than "11000/3", and the threshold X is determined as 3600 bits, for example.

The PCM judging unit 21 performs the above comparison using the threshold which is determined in the manner as described above, and, based on the result, when the buffered data amount does not exceed the threshold, gives the buffer input selection unit 11 an instruction to accumulate the next binary data in the intermediate buffer 12.

In accordance with the above instruction, the buffer input selection unit 11 selects the coded data, which is outputted from the image coding unit 10, as input data into itself, and outputs the selected coded data to the binarization unit 31. As a result, binary data is outputted from the binarization unit 31 and is accumulated in the intermediate buffer 12.

In addition, when a result of the above comparison shows that the buffered data amount exceeds the threshold, the PCM judging unit 21 gives the buffer input selection unit 11 an instruction to accumulate the next I_PCM data in the intermediate buffer 12.

In accordance with the above instruction, the buffer input selection unit 11 selects I_PCM data accumulated in the I_PCM data buffer 14 as input data into itself, and outputs the selected I_PCM data to the intermediate buffer 12, thereby causing the intermediate buffer 12 to accumulate the I_PCM data.

In this manner, the buffer input selection unit 11 causes the intermediate buffer 12 to accumulate, per unit of coding, either binary data or I_PCM data according to the result of the comparison performed by the I_PCM judging unit 21.

In addition, based on the above judgment result, the I_PCM judging unit 21 sends to the output selection unit 13 information indicating whether the data to be inputted into the intermediate buffer 12 is binary data or I_PCM data.

The intermediate buffer 12 sequentially outputs accumulated binary data to the arithmetic coding unit 32. The arithmetic coding unit 32 arithmetically codes binary data to be inputted, and outputs the data to the output selection unit 13. In other words, the arithmetic coding unit 32 outputs to the output selection unit 13 only arithmetically coded data which is to be finally outputted as a bit stream.

In addition, the arithmetic coding unit 32 updates the variable table kept in the intermediate buffer 12 every time arithmetic coding is performed.

Further, the intermediate buffer 12 bypasses the arithmetic coding unit 32 and outputs accumulated I_PCM data directly to the output selection unit 13.

In accordance with the information received from the I_PCM judging unit 21, the output selection unit 13 selects either the arithmetically coded data or the I_PCM data, and outputs the selected data as a bit stream.

According to the above configuration, by comparing the buffered data amount with the threshold before coded data of the predetermined unit is binarized, the I_PCM judging unit 21 can judge whether to accumulate, in the intermediate buffer 12, binary data obtained by binarizing the coded data or I_PCM data.

Moreover, only the binary data or the I_PCM data selected by the judgment is accumulated in the intermediate buffer 12, and used for a bit stream which is to be finally outputted.

Here, for image data of a certain unit of coding, when the I_PCM data, not the binary data, is inputted into the intermediate buffer 12, it is expected that the buffered data amount temporarily becomes larger than in the case where the binary data is inputted.

However, as described above, although the binary data accumulated in the intermediate buffer 12 is consumed by only an amount according to the processing capability of the arithmetic coding unit 32, I_PCM data is consumed at once or within a short time period because the I_PCM data is outputted by bypassing the arithmetic coding unit 32.

Therefore, in order to reduce the maximum accumulated amount in the intermediate buffer 12, namely, in order to minimize the capacity of the intermediate buffer 12, when the buffered data amount exceeds the threshold, it is effective to input I_PCM data into the intermediate buffer 12 instead of the binary data.

In addition, as described above, the arithmetic coding unit 32 outputs to the output selection unit 13 only the arithmetically coded data which is to be finally outputted as a bit stream. Therefore, unlike the conventional image coding device, a buffer to keep arithmetically coded data outputted from the arithmetic coding unit 32 is not needed.

In addition, the arithmetic coding unit 32 does not unnecessarily update a variable table kept in the intermediate buffer 12 because unnecessary arithmetic coding is not performed. Accordingly, since a situation where, after an update, the variable table has to be restored to its pre-update state does not occur, the variable table in the pre-update state does not have to be kept in an accumulation unit such as the intermediate buffer 12.

Figure 4:
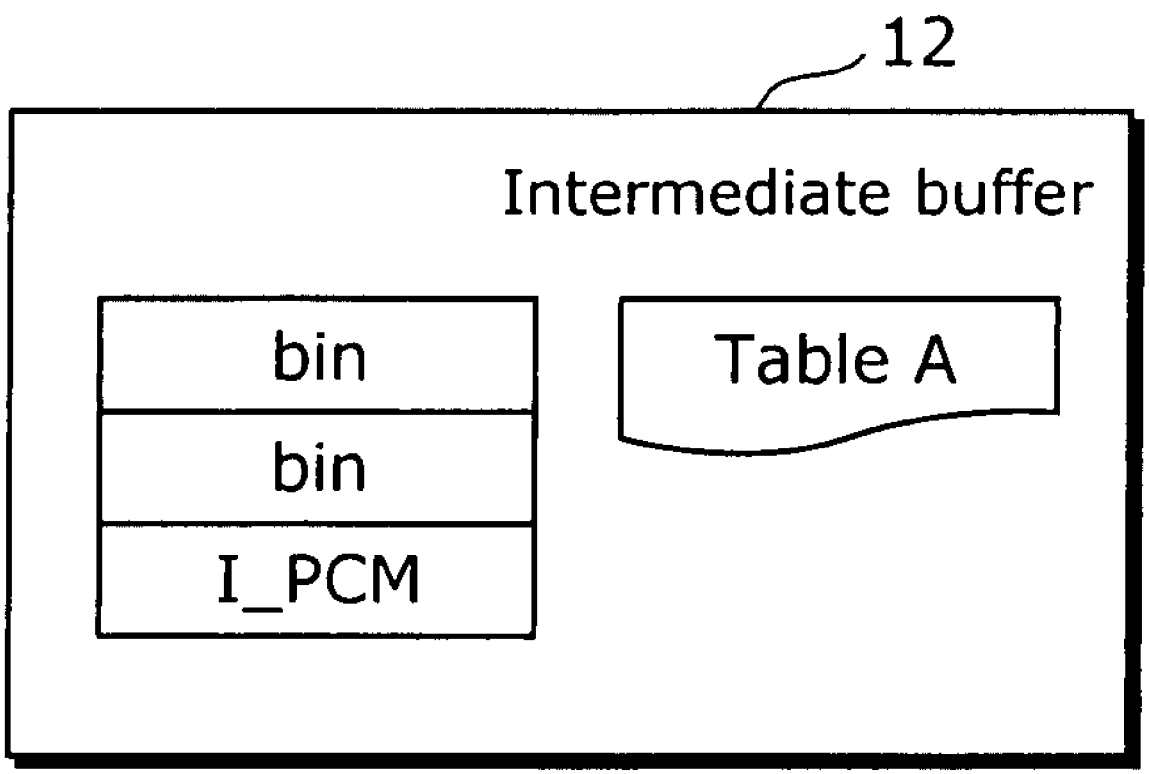
FIG. 4 is a schematic diagram showing an example of the configuration of data or the like kept in an intermediate buffer.

FIG. 4 is a schematic diagram showing an example of the configuration of data or the like kept in an intermediate buffer 12.

Figure 1:
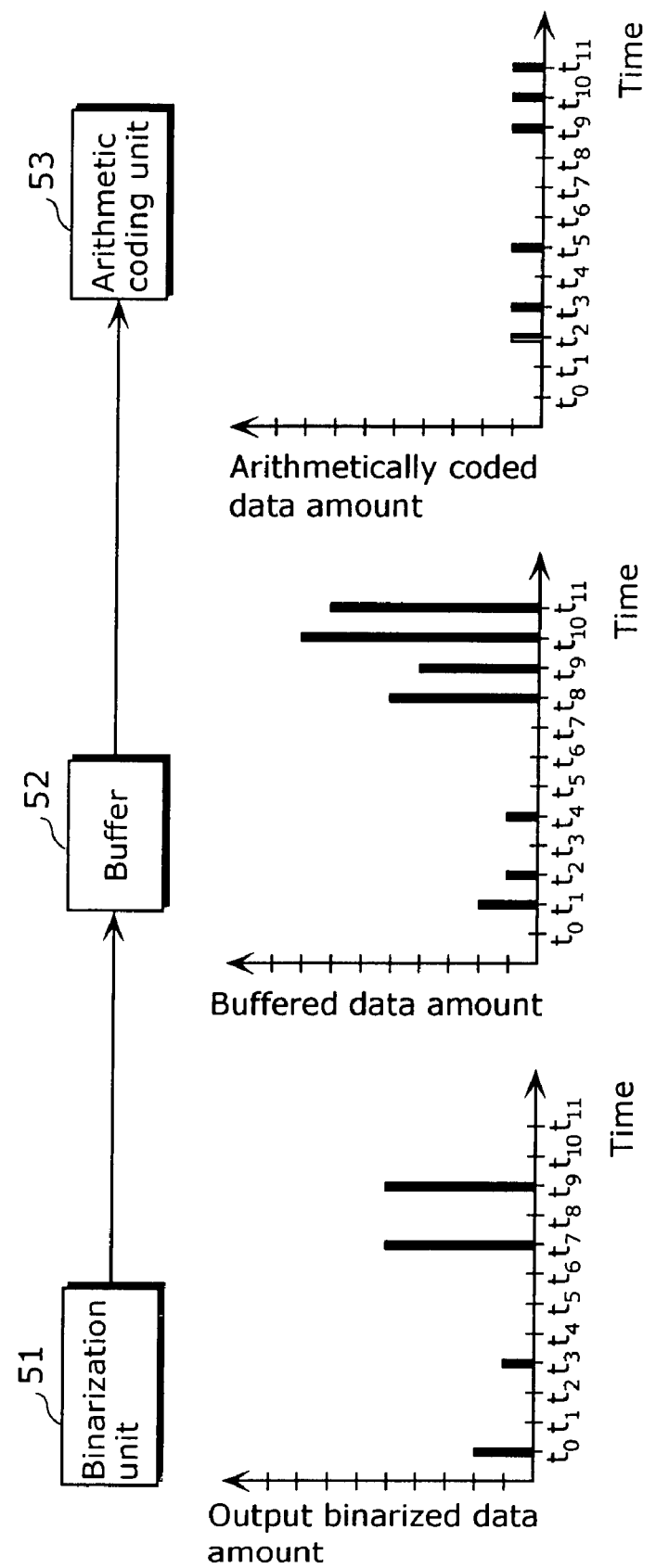
FIG. 1 is a diagram showing an example of changes in throughputs or accumulated amounts in a binarization unit, a buffer and an arithmetic coding unit in a conventional image coding device.
Figure 2:
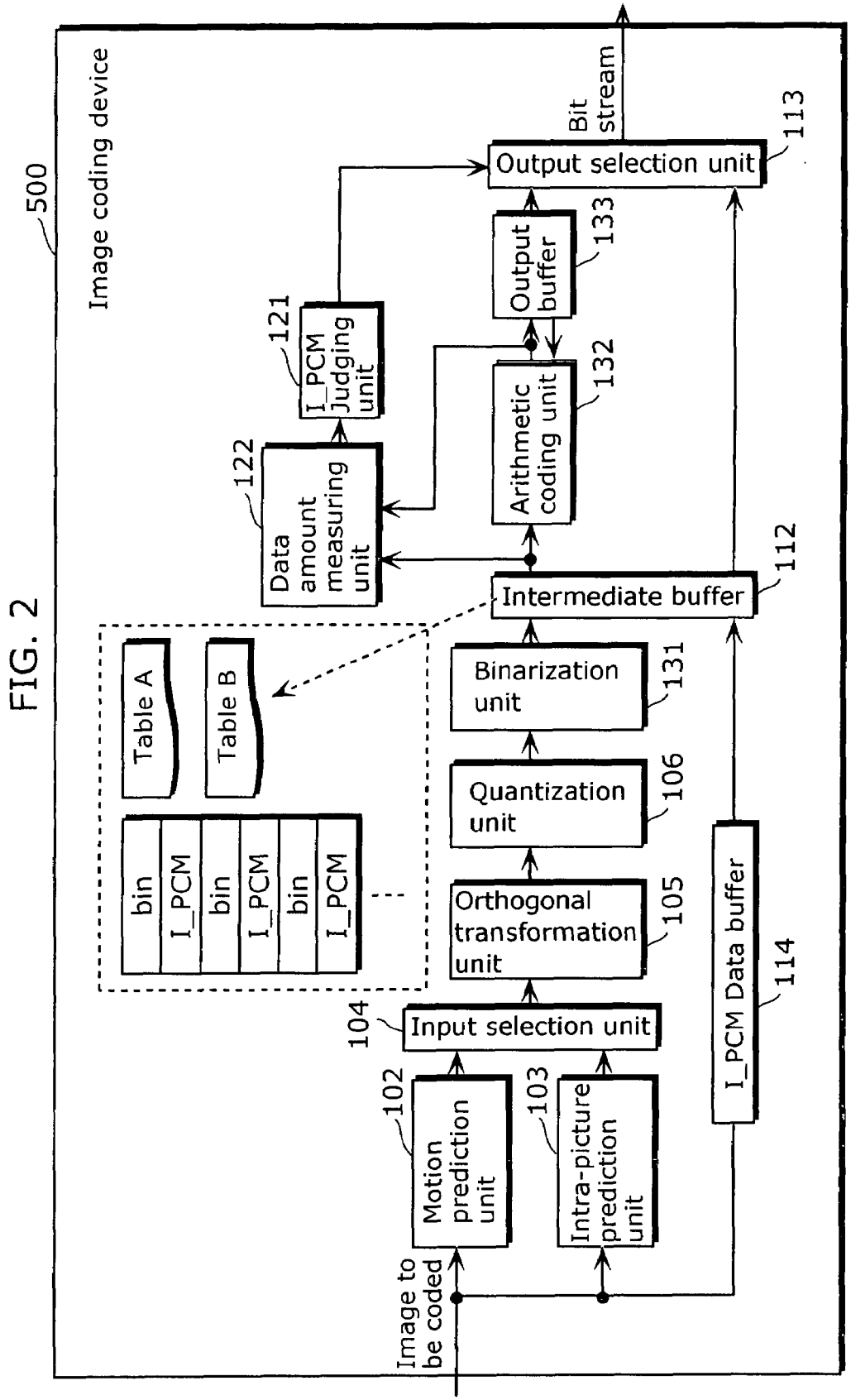
FIG. 2 is a functional block diagram showing the functional configuration of the conventional image coding device.

As shown in FIG. 4, unlike the intermediate buffer 112 in the conventional image coding device 500 shown in FIG. 2, the intermediate buffer 12 in the image coding device 100 of the present embodiment only needs to keep, as a variable table, the table A, which is the variable table referred to and updated by the arithmetic coding unit 32.

In addition, as shown in FIG. 2, a set of binary data and I_PCM data is always accumulated per unit of coding in the intermediate buffer 112 in the conventional image coding device 500, however, only either binary data or I_PCM data used for output is accumulated in the intermediate buffer 12 in the image coding device 100 of the present embodiment.

As described above, the image coding device 100 of the embodiment can arithmetically code binary data with buffer capacity smaller than that of the conventional image coding device, as the whole device.

Note that, in the embodiment, it is assumed that the accumulated amount measuring unit 22 measures the buffered data amount based on control information that the intermediate buffer 12 has. However, the buffered data amount may be measured using other methods.

For example, the buffered data amount may be measured by measuring the amount of input data and the amount of output data in the intermediate buffer 12, and calculating a difference between the amount of input data and the amount of output data.

In addition, it is assumed that the output selection unit 13 receives a notification of the comparison result from the I_PCM judging unit 21, selects either the arithmetically coded data or the I_PCM data and outputs the selected data as a bit stream.

However, the output selection unit 13 may select data to be outputted without receiving the information from the I_PCM judging unit 21. For example, when I_PCM data is inputted into the intermediate buffer 12, a control flag indicating that the I_PCM data should be outputted may be added to the I_PCM data and inputted into the intermediate buffer 12, so that the I_PCM data is outputted only when the output selection unit 13 detects the existence of the control flag.

In addition, for example, control information indicating that an coding type is I_PCM data may be added to the head of the I_PCM data and be accumulated in the intermediate buffer 12, so that the arithmetic coding unit 32 causes the output selection unit 13 to select the I_PCM data using the control information.

Figure 5:
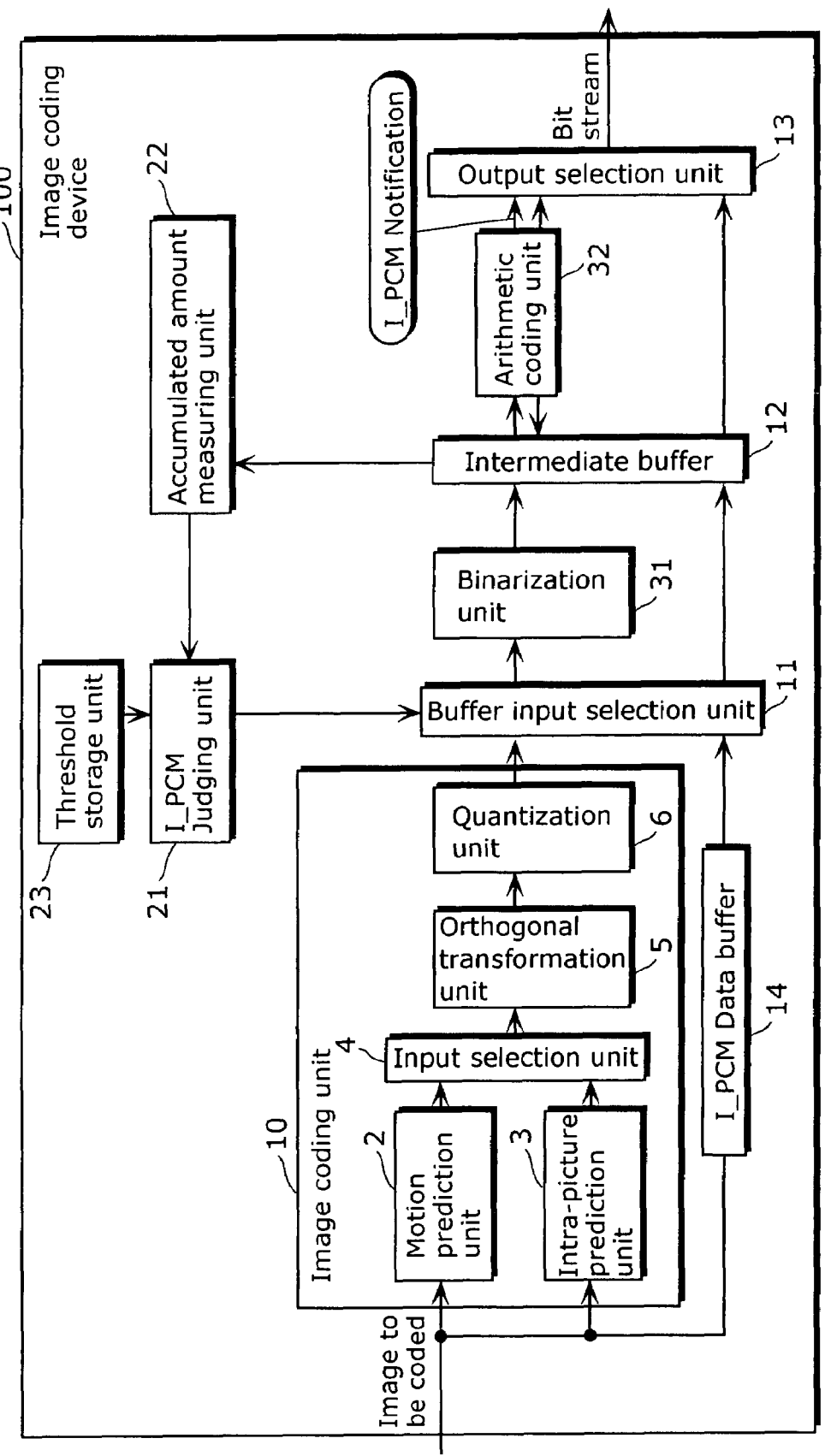
FIG. 5 is a functional block diagram of the image coding device of the first embodiment in which an arithmetic coding unit detects I_PCM data.

FIG. 5 is a functional block diagram of the image coding device 100 in which the arithmetic coding unit 32 detects I_PCM data.

When it is detected from the control information added to the data that data is I_PCM data, the arithmetic coding unit 32 notifies the output selection unit 13 that the data following the control information is I_PCM data (described as "I_PCM notification" in FIG. 5).

Upon reception of the notification, the output selection unit 13 reads out from the intermediate buffer 12 the I_PCM data corresponding to the control information, and outputs the read out I_PCM data.

This also allows the output selection unit 13 to appropriately select data to be outputted.

Note that, in the H.264 standard, there is data indicating the coding type of the macroblock at the head of each macroblock data (macroblock type data).

Thus, when the I_PCM data is outputted as a bit stream, in the image coding device 100, the binarization unit 31 binarizes the control information indicating that the data is I_PCM data, for example.

The arithmetic coding unit 32 arithmetically codes the macroblock type data, and, when the macroblock type data represents I_PCM, outputs the arithmetically coded macroblock type data to the output selection unit 13, and notifies the output selection unit 13 that the subsequent output data is I_PCM data.

The output selection unit 13 continuously outputs the I_PCM data following the arithmetically coded macroblock type data received from the arithmetic coding unit 32.

Processing by the above procedure allows the image coding device 100 to generate and output a coded stream compliant with the H.264 standard. In other words, a bit stream where coded data indicating that the data is I_PCM is followed by I_PCM data.

SECOND EMBODIMENT

As a second embodiment of the invention, an image coding device that determines a predicted amount of binary data, and selects data to be inputted into the intermediate buffer based on the predicted amount to will be described.

Figure 6:
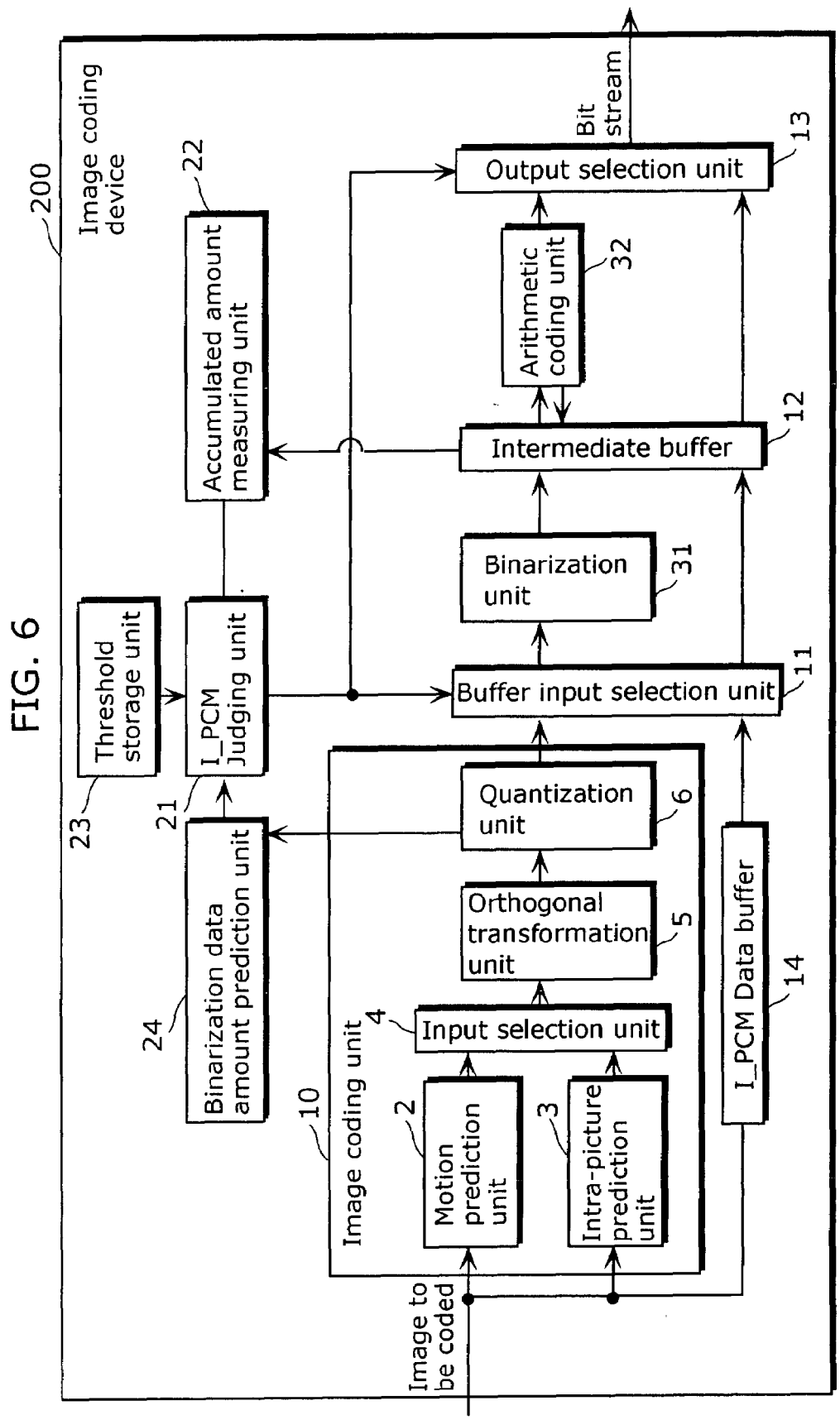
FIG. 6 is a functional block diagram showing the functional configuration of the image coding device of a second embodiment of the invention.

FIG. 6 is a functional block diagram showing the functional configuration of the image coding device 200 of the second embodiment of the invention. In FIG. 6, the same numerals are used for components that are identical to the components included in the image coding device 100 shown in FIG. 3, and descriptions thereof are omitted.

As shown in FIG. 6, the image coding device 200 of the second embodiment has binary data amount prediction unit 24 in addition to the components that the image coding device 100 has as shown in FIG. 3.

The binary data amount prediction unit 24 is a processing unit that determines a predicted amount, which is a predicted value of the amount of binary data in a case where coded data obtained by the image coding unit 10 is binarized.

More specifically, the binary data amount prediction unit 24 determines, from a post-quantization coefficient which is coded data obtained from the quantization unit 6 in the image coding unit 10, the amount of data in a case where the post-quantization coefficient is binarized, in other words, the predicted amount of the binary data.

Note that the binary data amount prediction unit 24 has a conversion table in which the value of the post-quantization coefficient is correlated to the number of bits of binary data, for example, and, with reference to the conversion table, the binary data amount prediction unit 24 can determine, from a post-quantization coefficient, the predicted amount of the binary data in a case where the post-quantization coefficient is binarized.

With reference to FIG. 6, the operation of the image coding device 200 constructed as described above will be described with a focus on the operation different from that of the image coding device 100 of the first embodiment.

A post-quantization coefficient is inputted from the quantization unit 6 into the binary data amount prediction unit 24. The binary data amount prediction unit 24 predicts the amount of the binary data of a case where the post-quantization coefficient is binarized, based on the post-quantization coefficient.

The predicted amount of the binary data is inputted into the I_PCM judging unit 21. The I_PCM judging unit 21 adds the predicted amount of the binary data to the buffered data amount inputted from the accumulated amount measuring unit 22, and compares the resulting buffered data amount with the threshold stored in the threshold storage unit 23.

In addition, the I_PCM judging unit 21 also compares the above predicted amount of the binary data with unit throughput, which is the amount of arithmetic coding that the arithmetic coding unit 32 can perform during the processing period corresponding to a unit of coding.

Here, the unit throughput means an amount of processing that the arithmetic coding unit 32 can perform per cycle, as described above in the description of the determination method of the threshold.

When a result of the above two types of comparison shows that the buffered data amount to which the predicted amount of the binary data is added (hereinafter referred to as "total amount") does not exceed the threshold, or the predicted amount of the binary data does not exceed the unit throughput, the I_PCM judging unit 21 gives the buffer input selection unit 11 an instruction to input the post-quantization coefficient into the binarization unit 31, and accumulate the binary data outputted from the binarization unit 31 in the intermediate buffer 12.

Further, when a result of the comparison shows that the total amount exceeds the threshold, and the predicted amount of the binary data exceeds the unit throughput, the I_PCM judging unit 21 gives the buffer input selection unit 11 an instruction to accumulate the I_PCM data in the intermediate buffer 12.

Subsequently, when the binary data is accumulated in the intermediate buffer 12, the binary data is arithmetically coded by the arithmetic coding unit 32, and inputted into the output selection unit 13 as arithmetically coded data. On the other hand, when the I_PCM data is accumulated in the intermediate buffer 12, the I_PCM data is inputted into the output selection unit 13.

In accordance with the information received from the I_PCM judging unit 21, the output selection unit 13 outputs, as a bit stream, either the arithmetically coded data or the I_PCM data.

As described above, after adding the predicted amount of the binary data to the measured buffered data amount, the image coding device 200 of the embodiment compares the amount with the threshold, additionally compares the predicted amount of the binary data with the unit throughput, and selects whether to input the binary data or the I_PCM data into the intermediate buffer 12 according to the results of the two types of comparisons.

More specifically, even if the total amount exceeds the threshold, when the predicted amount of the binary data is equal to or less than the unit throughput, the binary data is inputted into the intermediate buffer 12.

For example, a cycle is assumed to be in a situation where a threshold is 5000 bits, a buffered data amount is 4000 bits, the predicted amount of binary data is 2000 bits and the unit throughput of the arithmetic coding unit 32 is 2500 bits.

In this cycle, the total amount reaches 6000 bits, which exceeds the threshold. However, even if the binary data having 2000 bits is inputted into the intermediate buffer 12 in the next cycle, the binary data having 2500 bits is consumed in the intermediate buffer 12 in the same next cycle, therefore, the intermediate buffer 12 never overflows.

As described above, even if the total amount exceeds the threshold, when the predicted amount of the binary data does not exceed the unit throughput of the arithmetic coding unit 32, the intermediate buffer 12 never overflows even if the binary data is inputted into the intermediate buffer 12.

This allows a reduction in the possibility that the output is unnecessarily switched to the I_PCM data, and therefore, the coding amount of bit streams to be finally outputted can be reduced.

Note that, although, in the present embodiment, the amount of the binary data of the next unit of coding is predicted based on the post-quantization coefficient which is outputted from the quantization unit 6, the amount of the binary data may be predicted based on other data such as data outputted from the motion prediction unit 2.

In addition, although the binary data amount prediction unit 24 determines the predicted amount of the binary data using a conversion table, the predicted amount of the binary data may be determined using other approaches. For example, the predicted amount of the binary data may be determined using a conversion equation for converting the post-quantization coefficient into the predicted amount of the binary data.

THIRD EMBODIMENT

As a third embodiment of the invention, the following will describe an image coding device that accepts an input of a required bit rate, which is the bit rate required for a bit stream to be outputted, and changes a threshold based on the accepted required bit rate.

Figure 7:
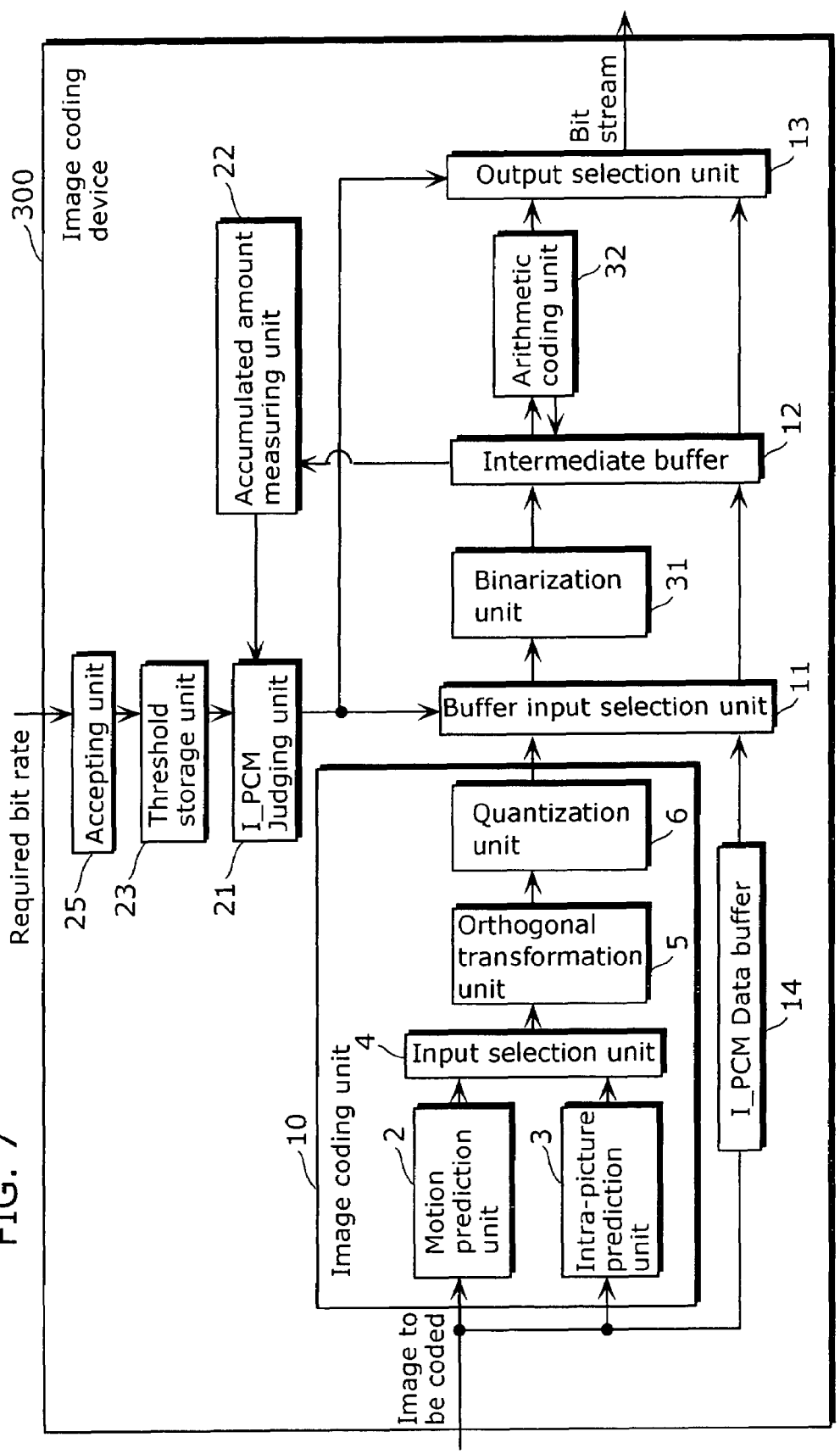
FIG. 7 is a functional block diagram showing the functional configuration of the image coding device of a third embodiment of the invention.

FIG. 7 is a functional block diagram showing the functional configuration of the image coding device 300 of the third embodiment of the invention. In FIG. 7, the same numerals are used for components that are identical to the components included in the image coding device 100 shown in FIG. 3, and descriptions thereof are omitted.

As shown in FIG. 7, the image coding device 300 of the third embodiment has an accepting unit 25 in addition to the components that the image coding device 100 has as shown in FIG. 3.

The accepting unit 25 is a processing unit which accepts information indicating the required bit rate, and changes the threshold stored in the threshold storage unit according to the information. The required bit rate is determined and inputted into the image coding device 300 by a user, for example.

With reference to FIG. 7, operations of the image coding device 300 of the embodiment constructed as described above will be described with a focus on operations different from that of the image coding device 100 of the first embodiment.

Note that it is assumed that, as a bit rate that can be set on the image coding device 300, there are two types of bit rates: a first bit rate and a second bit rate that is higher than the first bit rate. In addition, it is assumed that information indicating the first bit rate is first information, and information indicating the second bit rate is second information.

Further, it is assumed that there are two thresholds different from each other: a first threshold, and a second threshold that is higher than the first threshold. These are also applied to variations 1 and 2 of the third embodiment as described later.

By performing a predetermined operation by a user on the image coding device 300 or equipment including the image coding device 300, the accepting unit 25 accepts the information indicating the required bit rate.

The accepted information is sent to the image coding unit 10, and coding is performed according to the information.

More specifically, when receiving the first information from the accepting unit 25 as the information indicating the required bit rate, in other words, when receiving the information indicating a relatively low required bit rate, the image coding unit 10 outputs, as coded data, data compressed at a high compression rate to the buffer input selection unit 11 in order to lower the bit rate.

In addition, when receiving the second information from the accepting unit 25, in other words, when receiving the information indicating a relatively high required bit rate, the image coding unit 10 outputs, as coded data, data compressed at a low compression rate to the buffer input selection unit 11.

Further, upon acceptance of the information indicating the required bit rate, the accepting unit 25 changes the threshold stored in the threshold storage unit 23 according to the accepted bit rate.

More specifically, when the first information is accepted, in other words, when the information indicating a relatively low required bit rate is received, the coded data having a high compression rate is outputted from the image coding unit 10, as described above. Accordingly, it is predicted that the amount of the binary data after the coded data is binarized is relatively low. Therefore, the threshold used for I_PCM judgment is changed to the second threshold, which is a higher threshold.

On the other hand, when the second information is accepted, in other words, when the information indicating a relatively high required bit rate is received, the coded data having a low compression rate is outputted from the image coding unit 10, as described above. Accordingly, it is predicted that the amount of the binary data after the coded data is binarized is relatively high. Therefore, the threshold used for I_PCM judgment is changed to the first threshold, which is a lower threshold.

In this manner, the change of the threshold allows a reduction in the probability that the output is unnecessarily switched to the I_PCM data even though arithmetic coding can be performed with the remaining buffer capacity. Therefore, the coding amount of bit streams outputted by the image coding device 300 can be reduced.

Note that, although, in the embodiment, the threshold is changed according to the bit rate information indicating the required bit rate, the threshold may be changed according to an operation processing capability of the arithmetic coding unit 32, a past coding situation or other parameters.

Thus, as variations 1 and 2 of the third embodiment, the following will describe cases where the threshold is changed according to an operation processing capability of the arithmetic coding unit 32 and a change in the amount of generated binary data, respectively.

FIRST VARIATION OF THIRD EMBODIMENT

With the image coding device, a case is assumed where an operating clock frequency can be reduced in order to lower the power consumption, for example, in other words, a case is assumed where an operating clock frequency is variable.

Here, since the operating clock frequency has a positive correlation with an operation processing capability (hereinafter, simply referred to as "processing capability"), the fact that the operating clock frequency is variable means that the processing capability is variable.

In this case, the change of the threshold according to the processing capability of the arithmetic coding unit 32 allows the intermediate buffer 12 to be used efficiently, and the coding amount of the output bit streams to be reduced.

Figure 8:
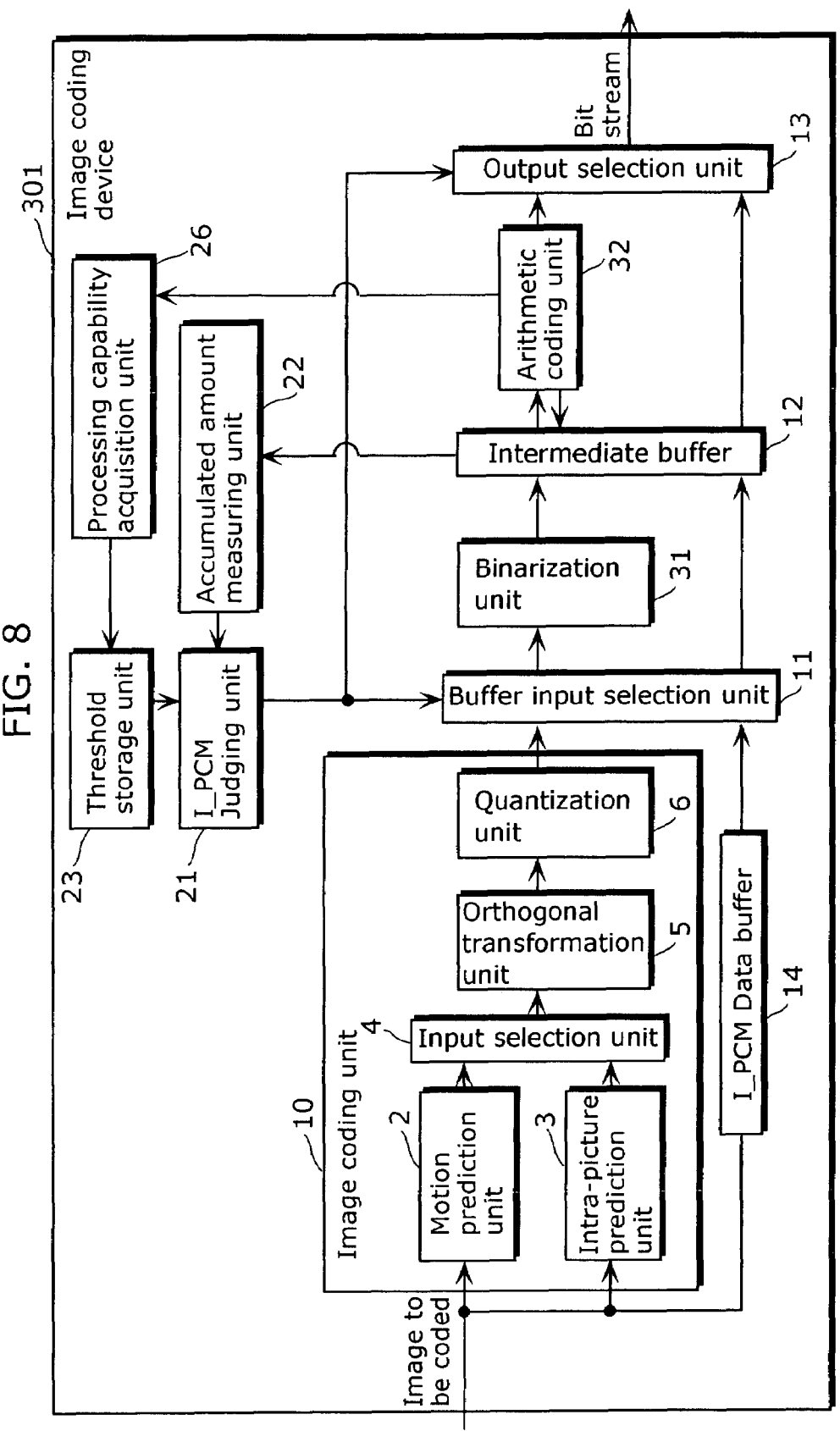
FIG. 8 is a functional block diagram showing the functional configuration of the image coding device in which a threshold is changed according to a processing capability of the arithmetic coding unit.

FIG. 8 is a functional block diagram showing the functional configuration of the image coding device in which a threshold is changed according to the processing capability of the arithmetic coding unit 32.

The image coding device 301 shown in FIG. 8 is provided with a processing capability acquisition unit 26 as a processing unit that changes the threshold.

The processing capability acquisition unit 26 is a processing unit which acquires capability information indicating a processing capability of arithmetic coding performed by the arithmetic coding unit 32, and changes the threshold stored in the threshold storage unit 23 according to the capability information.

Note that it is assumed that, as the processing capability of the arithmetic coding unit 32, there are two types of processing capability: a first processing capability, and a second processing capability that is higher than the first processing capability. In addition, operations of the processing capability acquisition unit 26 will be described, assuming that information indicating the first processing capability is first capability information, and information indicating the second processing capability is second capability information.

The processing capability acquisition unit 26 acquires capability information from the arithmetic coding unit 32. When the acquired capability information is the first capability information, in other words, when the information indicating a relatively low processing capability is acquired, it means that the amount of the binary data that the arithmetic coding unit 32 can process within a unit time is low.

In other words, this means that the consumption per unit time of the binary data accumulated in the intermediate buffer 12 is low. Therefore, the threshold used for I_PCM judgment is changed to the first threshold, which is a lower threshold.

On the other hand, when the capability information acquired by the processing capability acquisition unit 26 indicates the second information, in other words, when the information indicating a relatively high processing capability is acquired, it means that the amount of the binary data that the arithmetic coding unit 32 can process during a unit time is high.

In other words, this means that the consumption per unit time of the binary data accumulated in the intermediate buffer 12 is high. Therefore, the threshold used for I_PCM judgment is changed to the second threshold, which is a higher threshold.

In this manner, the threshold may be changed according to the processing capability of the arithmetic coding unit 32. In addition, this allows a reduction in the possibility that the output is unnecessarily switched to the I_PCM data. Therefore, the coding amount of bit streams outputted by the image coding device 301 can be reduced.

SECOND VARIATION OF THIRD EMBODIMENT

In image data coded by the image coding device, images with spatially or temporally closely coded units are similar to each other. Therefore, it is highly possible that the amounts of the binary data to be generated become almost the same. Using this fact, whether the amount of binary data to be generated later is relatively high or relatively low can be predicted from a change in the amount of the binary data outputted from the binarization unit 31.

In other words, the threshold can be changed according to the change in the amount of the binary data. This allows the intermediate buffer 12 to be used efficiently, and the coding amount of the output bit stream to be reduced.

Figure 9:
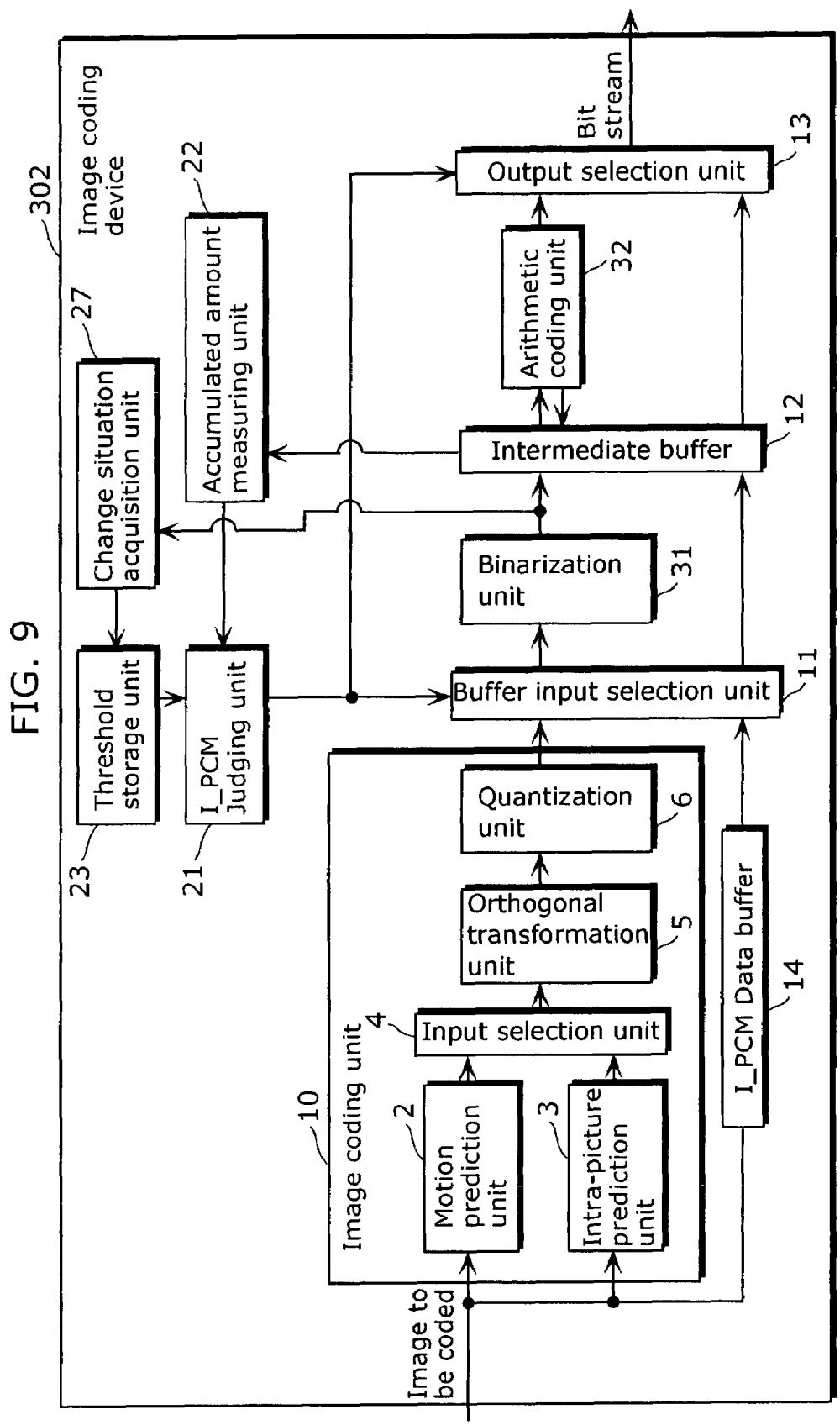
FIG. 9 is a functional block diagram showing the functional configuration of the image coding device in which a threshold is changed according to the change in the amount of binary data outputted from a binarization unit.

FIG. 9 is a functional block diagram showing the functional configuration of the image coding device in which a threshold is changed according to the change in the amount of binary data outputted from the binarization unit 31.

The image coding device 302 shown in FIG. 9 is provided with a change situation acquisition unit 27 as a processing unit that changes the threshold.

The change situation acquisition unit 27 is a processing unit which predicts whether the amount of binary data to be generated later is relatively high or low, based on the change in the amount of binary data outputted from the binarization unit 31, and changes the threshold according to the result of the prediction.

Note that the change situation acquisition unit 27 is an example of the processing unit that realizes a function for predicting the amount of binary data to be generated later, which a change prediction unit has, and a function for changing the threshold, which a change unit has, in the image coding device of the invention.

Operations of the change situation acquisition unit 27 will be described below.

The change situation acquisition unit 27 sequentially acquires the amount of binary data outputted from the binarization unit 31. In addition, the change situation acquisition unit 27 predicts, based on the change in the amount of the binary data, whether or not the amount of subsequent binary data exceeds a predetermined amount.

For example, when the amount of the binary data that exceeds the predetermined amount is outputted from the binarization unit 31 continuously only for a certain time period or by a certain number of units of coding, it is predicted that the amount of subsequent binary data also exceeds the predetermined amount continuously only for a certain time period or by a certain number of units of coding.

Similarly, when the amount of the binary data that does not exceed the predetermined amount is outputted from the binarization unit 31 continuously only for a certain time period or by a certain number of units of coding, it is predicted that the amount of subsequent binary data also does not exceed the predetermined amount continuously for a certain time period or by a certain number of units of coding.

Based on the result of the prediction, when it is predicted that the amount of subsequent binary data exceeds the predetermined amount, the threshold is changed to the first threshold, which is a lower threshold.

On the other hand, when it is predicted that the amount of subsequent binary data does not exceed the predetermined amount, the threshold is changed to the second threshold, which is a higher threshold.

In this manner, the threshold can be changed according to the change in the amount of the binary data outputted from the binarization unit 31. In addition, this allows a reduction in the possibility that the output is unnecessarily switched to the I_PCM data. Therefore, the coding amount of bit streams outputted by the image coding device 302 can be reduced.

Note that, in each of the image coding device 300, the image coding device 301 and the image coding device 302, there are two levels of thresholds, namely, the first threshold and the second threshold, and the thresholds are changed according to the information related to coding, such as a high or low required bit rate.

However, three or more levels of thresholds may be provided so that the threshold may be changed to any of the three or more thresholds according to the information related to coding.

In addition, instead of changing to a predetermined threshold, a threshold after a change may be determined by an arithmetic expression after converting the information related to coding into numbers, for example.

In this manner, in the image coding device, based on the information related to coding such as a high or low required bit rate, precise control of changing a threshold can be achieved. In other words, the intermediate buffer can be used efficiently according to a change in a situation of coding, and the possibility that the output is unnecessarily switched to the I_PCM data can be reduced. In other words, the coding amount of bit streams to be outputted can be reduced.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The invention can be applied to image coding devices that perform arithmetic coding. More specifically, the invention is useful in image coding devices that output High-Definition images or the like coded by a data compression technique specified in the H.264/AVC standard.

What is claimed is:

1. An image coding device comprising:
   an image coding unit operable to sequentially code image data per predetermined unit;
   a binarization unit operable to binarize the coded image data obtained from said image coding unit;
   an accumulation unit operable to accumulate I_PCM data or binary data per predetermined unit corresponding to the image data, the binary data being obtained from said binarization unit;
   a measuring unit operable to measure an amount of data accumulated in said accumulation unit;
   a comparison unit operable to compare the amount of the data measured by said measuring unit with a threshold per predetermined unit;
   an accumulation selection unit operable to, based on a result of the comparison by said comparison unit, cause said accumulation unit to accumulate binary data obtained by inputting next coded image data into said binarization unit when the amount of the data does not exceed the threshold and cause said accumulation unit to accumulate next I_PCM data when the amount of the data exceeds the threshold;
   an arithmetic coding unit operable to arithmetically code the binary data accumulated in said accumulation unit; and
   an output unit operable to output the arithmetically coded data obtained from said arithmetic coding unit when the binary data is arithmetically coded by said arithmetic coding unit and output the I_PCM data accumulated in said accumulation unit when the I_PCM data is accumulated in said accumulation unit.

2. The image coding device according to claim 1,
   wherein said comparison unit is operable to notify said output unit of the result of the comparison; and
   said output unit is operable to, based on the notified result of the comparison, output the arithmetically coded data obtained by said arithmetic coding unit when the amount of data does not exceed the threshold or output the I_PCM data accumulated in said accumulation unit when the amount of data exceeds the threshold.

3. The image coding device according to claim 1, further comprising:
   a prediction unit operable to sequentially determine a predicted amount which is a predicted value of the amount of binary data when the coded data obtained from said image coding unit is binarized;

wherein, after adding the predicted amount determined by said prediction unit to the amount of the data measured by said measuring unit, said comparison unit is operable to compare the resulting amount of the data with the threshold and is operable to compare the predicted amount with a unit throughput which is an amount of arithmetic coding that said arithmetic coding unit can perform during a processing period corresponding to the predetermined unit; and based on a result of the comparison by said comparison unit, said accumulation selection unit is operable to:

cause said accumulation unit to accumulate the binary data obtained by inputting the next coded image data into said binarization unit when the resulting amount of the data does not exceed the threshold or when the predicted amount does not exceed the unit throughput; or cause said accumulation unit to accumulate the next I_PCM data when the resulting amount of the data exceeds the threshold and the predicted amount exceeds the unit throughput.

4. The image coding device according to claim 1, further comprising:

a threshold storage unit operable to store the threshold; and an accepting unit operable to accept information indicating a bit rate required for the data outputted by said output unit and operable to change the threshold stored in said threshold storage unit according to the information indicating the bit rate;

wherein the information indicating the bit rate is first information indicating a first bit rate or second information indicating a second bit rate which is higher than the first bit rate;

said image coding unit is operable to code the image data at a higher compression rate when the first information is accepted by said accepting unit than when the second information is accepted; and said accepting unit is operable to change the threshold to a first value when the first information is accepted and to a second value that is smaller than the first value when the second information is accepted.

5. The image coding device according to claim 1, further comprising:

a threshold storage unit operable to store the threshold; and a capability acquisition unit operable to acquire capability information indicating a processing capability of said arithmetic coding unit in performing arithmetic coding and operable to change the threshold stored in said threshold storage unit according to the capability information;

wherein the capability information is first information indicating a first processing capability or second information indicating a second processing capability that is higher than the first processing capability; and said capability acquisition unit is operable to change the threshold to a first value when the first information is accepted and to a second value that is higher than the first value when the second information is accepted.

6. The image coding device according to claim 1, further comprising:

a threshold storage unit operable to store the threshold;

a change prediction unit operable to sequentially acquire the amount of the binary data obtained by said binarization unit and operable to predict whether or not an amount of the binary data to be obtained later exceeds a predetermined amount; and a change unit operable to change the threshold to a first value when said change prediction unit predicts that the amount of the binary data obtained later exceeds the predetermined amount and operable to change the threshold to a second value that is higher than the first value when said change prediction unit predicts that the amount of the binary data obtained later does not exceed the predetermined amount.

7. The image coding device according to claim 1, wherein said measuring unit is operable to measure the amount of the data inputted into said accumulation unit, the amount of the data outputted from said accumulation unit and the amount of the data accumulated in said accumulation unit, the amount of data accumulated is measured by calculating a difference between the measured amount of the data inputted into said accumulation unit and the measured amount of the data outputted from said accumulation unit.

8. The image coding device according to claim 1, wherein said arithmetic coding unit is operable to read out the data accumulated in said accumulation unit and notify said output unit that the data is I_PCM data when control information indicating that the data is I_PCM data is added to the read out data, and said output unit is operable to output the I_PCM data accumulated in said accumulation unit when said output unit is notified that the data is the I_PCM data.

9. The image coding device according to claim 8, wherein said control information is binary data indicating that the data is I_PCM data, said arithmetic coding unit is operable to notify said output unit that the data is I_PCM data when the control information is arithmetically coded and outputted to said output unit, and said output unit is operable to output, when notified that the data is I_PCM data, the I_PCM data accumulated in said accumulation unit after outputting the arithmetically coded control information received from said arithmetic coding unit.

10. An image coding method comprising:

sequentially coding image data per predetermined unit;

measuring an amount of data accumulated in an accumulation unit;

comparing the amount of the data measured in said measuring with a threshold per predetermined unit;

based on a result of the comparison in said comparing, binarizing next coded image data and causing the accumulation unit to accumulate the binary data obtained by the binarization when the amount of the data measured does not exceed the threshold and causing the accumulation unit to accumulate next I_PCM data per predetermined unit corresponding to the image data, when the amount of the data exceeds the threshold;

arithmetically coding the binary data accumulated in the accumulation unit; and outputting the arithmetically coded data obtained in said arithmetic coding when the binary data is arithmetically coded in said arithmetic coding and outputting the I_PCM data accumulated in the accumulation unit when the I_PCM data is accumulated in the accumulation unit.

11. The image coding method according to claim 10, further comprising:

determining a predicted amount which is a predicted value of an amount of binary data when the coded image data is binarized;

adding the determined predicted amount to the amount of the data measured in said measuring;

comparing the resulting amount of the data with the threshold and the predicted amount with a unit throughput which is an amount of arithmetic coding that can be performed during a processing period corresponding to the predetermined unit; and based on a result of the comparison:

causing binary data obtained by binarizing next coded image data to accumulate when the resulting amount of the data does not exceed the threshold or when the predicted amount does not exceed the unit throughput; or causing next I_PCM data to accumulate when the resulting amount of the data exceeds the threshold and the predicted amount exceeds the unit throughput.

12. The image coding method according to claim 10, further comprising:

storing the threshold;

accepting information indicating a bit rate required for the outputted data; and changing the stored threshold according to the information indicating the bit rate;

wherein the information indicating the bit rate is first information indicating a first bit rate or second information indicating a second bit rate which is higher than the first bit rate;

wherein the image data is coded at a higher compression rate when the first information is accepted than when the second information is accepted; and wherein the threshold is changed to a first value when the first information is accepted and to a second value that is smaller than the first value when the second information is accepted.

13. The image coding method according to claim 10, further comprising:

storing the threshold;

acquiring capability information indicating a processing capability of an arithmetic coding unit in performing arithmetic coding;

changing the stored threshold according to the capability information;

wherein the capability information is first information indicating a first processing capability or second information indicating a second processing capability that is higher than the first processing capability; and wherein the threshold is changed to a first value when the first information is accepted and is changed to a second value that is higher than the first value when the second information is accepted.

14. The image coding method according to claim 10, further comprising:

storing the threshold;

sequentially acquiring an amount of binary data obtained by binarizing the coded image data;

predicting whether or not an amount of binary data to be obtained later exceeds a predetermined amount; and changing the threshold to a first value when the amount of the binary data obtained later is predicted to exceed the predetermined amount; and changing the threshold to a second value that is higher than the first value when the amount of the binary data obtained later is predicted not to exceed the predetermined amount.

15. The image coding method according to claim 10, reading out the accumulated data;

notifying an output unit that the accumulated data is I_PCM data when control information indicating that the data is I_PCM data is added to the read out data; and outputting the I_PCM data when said output unit is notified that the data is the I_PCM data.

16. The image coding method according to claim 15, wherein the control information is binary data indicating that the data is I_PCM data;

the output unit is notified that the data is I_PCM data when the control information is arithmetically coded and outputted to the output unit; and the output unit is operable to output, when notified that the data is I_PCM data, the I_PCM data after outputting the arithmetically coded control information.

17. A program recorded on a computer readable medium which causes a computer to execute:

sequentially coding image data per predetermined unit;

measuring an amount of data accumulated in an accumulation unit;

comparing the amount of the data measured in said measuring with a threshold per predetermined unit;

based on a result of the comparison in said comparing, binarizing next coded image data and causing the accumulation unit to accumulate the binary data obtained by the binarization when the amount of the data does not exceed the threshold and causing the accumulation unit to accumulate next I_PCM data per predetermined unit corresponding to the image data when the amount of the data exceeds the threshold;

arithmetically coding the binary data accumulated in the accumulation unit; and outputting the arithmetically coded data obtained in said arithmetic coding when the binary data is arithmetically coded in said arithmetic coding and outputting the I_PCM data accumulated in the accumulation unit when the I_PCM data is accumulated in the accumulation unit.

18. A program according to claim 17, further causing a computer to execute:

determining a predicted amount which is a predicted value of an amount of binary data when the coded data is binarized;

adding the determined predicted amount to the amount of the data measured in said measuring;

comparing the resulting amount of the data with the threshold and the predicted amount with a unit throughput which is an amount of arithmetic coding that can be performed during a processing period corresponding to the predetermined unit; and based on a result of the comparison:

causing binary data obtained by binarizing next coded image data to accumulate when the resulting amount of the data does not exceed the threshold or when the predicted amount does not exceed the unit throughput; or causing next I_PCM data to accumulate when the resulting amount of the data exceeds the threshold and the predicted amount exceeds the unit throughput.

19. An integrated circuit comprising:

an image coding unit operable to sequentially code image data per predetermined unit;

a binarization unit operable to binarize the coded image data obtained from said image coding unit;

an accumulation unit operable to accumulate I_PCM data or binary data per predetermined unit corresponding to the image data, the binary data being obtained from said binarization unit;

a measuring unit operable to measure an amount of the data accumulated in said accumulation unit;

a comparison unit operable to compare the amount of the data measured by said measuring unit with a threshold per predetermined unit;

an accumulation selection unit operable to, based on a result of the comparison by said comparison unit, cause said accumulation unit to accumulate binary data obtained by inputting next coded image data into said binarization unit when the amount of the data does not exceed the threshold and cause said accumulation unit to accumulate next I_PCM data when the amount of the data exceeds the threshold;

an arithmetic coding unit operable to arithmetically code the binary data accumulated in said accumulation unit; and an output unit operable to output the arithmetically coded data obtained from said arithmetic coding unit when the binary data is arithmetically coded by said arithmetic coding unit and output the I_PCM data accumulated in said accumulation unit when the I_PCM data is accumulated in said accumulation unit.

20. An integrated circuit according to claim 18, further comprising:

a prediction unit operable to sequentially determine a predicted amount which is a predicted value of the amount of binary data when the coded data obtained from said image coding unit is binarized;

wherein, after adding the predicted amount determined by said prediction unit to the amount of the data measured by said measuring unit, said comparison unit is operable to compare the resulting amount of the data with the threshold and is operable to compare the predicted amount with a unit throughput which is an amount of arithmetic coding that said arithmetic coding unit can perform during a processing period corresponding to the predetermined unit; and based on a result of the comparison by said comparison unit, said accumulation selection unit is operable to:

cause said accumulation unit to accumulate the binary data obtained by inputting the next coded image data into said binarization unit when the resulting amount of the data does not exceed the threshold or when the predicted amount does not exceed the unit throughput; or cause said accumulation unit to accumulate the next I_PCM data when the resulting amount of the data exceeds the threshold and the predicted amount exceeds the unit throughput.

* * * * *